United States Patent
Hardwick et al.

(10) Patent No.: US 12,393,453 B2
(45) Date of Patent: Aug. 19, 2025

(54) SELF-MODIFYING PACKET PROCESSING GRAPH

(71) Applicant: MICROSOFT TECHNOLOGY LICENSING, LLC, Redmond, WA (US)

(72) Inventors: Jonathan Eric Hardwick, Chesterfield (GB); Christopher Neil Swindle, Biggleswade (GB); Matthew Ian Ronald Williams, London (GB); Michael Jeffrey Evans, Harpenden (GB)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 861 days.

(21) Appl. No.: 17/317,645

(22) Filed: May 11, 2021

(65) Prior Publication Data
US 2022/0261283 A1 Aug. 18, 2022

Related U.S. Application Data

(60) Provisional application No. 63/150,545, filed on Feb. 17, 2021.

(51) Int. Cl.
*G06F 9/50* (2006.01)
*H04L 47/70* (2022.01)
(Continued)

(52) U.S. Cl.
CPC .............. *G06F 9/50* (2013.01); *H04L 47/82* (2013.01); *G06F 9/45533* (2013.01); *G06F 2209/5011* (2013.01); *G06N 20/00* (2019.01)

(58) Field of Classification Search
CPC .................. G06F 9/50; G06F 9/45533; G06F 2209/5011; G06F 9/45558;
(Continued)

(56) References Cited

U.S. PATENT DOCUMENTS 10,516,626 B1 * 12/2019 Kodeboyina ........... H04L 49/25
2007/0183418 A1 * 8/2007 Riddoch ................. H04L 12/18
370/389

(Continued)

OTHER PUBLICATIONS

Zhang, Tianzhu, "NFV Platform Design: A Survey" Dec. 29, 2020, arxiv.org, Cornell University Ithaca NY, p. 20-21 (Year: 2020).*
(Continued)

*Primary Examiner* — Brian J. Gillis
*Assistant Examiner* — Juan C Turriate Gastulo
(74) *Attorney, Agent, or Firm* — Han Gim; Newport IP, LLC

(57) ABSTRACT

The techniques disclosed herein improve existing systems by receiving a packet to process and determining an associated packet processing graph for the packet. In response to determining that the associated packet processing graph contains an action comprising a set of rules for modifying the packet processing graph, a table to modify in the packet processing graph is accessed based on a table identifier in the action. The accessed table is modified by inserting one or more table rows into the packet processing graph and for each inserted table row, inserting a set of template actions containing prepopulated fields. The modified table is used to process subsequent packets.

20 Claims, 7 Drawing Sheets

(51) Int. Cl.
*G06F 9/455* (2018.01)
*G06N 20/00* (2019.01)

(58) Field of Classification Search
CPC ... G06F 2009/45595; G06F 2009/4559; H04L 47/82; G06N 20/00
See application file for complete search history.

(56) References Cited

U.S. PATENT DOCUMENTS

| | | | |
|---|---|---|---|
| 2014/0241361 A1* | 8/2014 | Bosshart | H04L 45/745 370/392 |
| 2016/0112317 A1* | 4/2016 | Hood | H04L 41/0893 370/392 |
| 2020/0097269 A1* | 3/2020 | Wang | G06F 8/41 |
| 2021/0103408 A1* | 4/2021 | Thantry | G06F 3/061 |

OTHER PUBLICATIONS

"International Search Report and Written Opinion Issued in PCT Application No. PCT/US22/013806", Mailed Date: May 2, 2022, 12 Pages.

Zhang, Tianzhu, "NFV Platform Design: A Survey", In Repository of arXiv:2002.11059v3, Dec. 29, 2020, 29 Pages.

* cited by examiner

SELF-MODIFYING PACKET PROCESSING GRAPH

PRIORITY APPLICATION

This application claims the benefit of and priority to U.S. Provisional Application No. 63/150,545, filed Feb. 17, 2021, the entire contents of which are incorporated herein by reference.

BACKGROUND

A data center is a facility that houses computer systems and various networking, storage, and other related components. Data centers may, for example, be used by service providers to provide computing services to businesses and individuals as a remote computing service or provide "software as a service" (e.g., cloud computing). Software defined networking (SDN) enables centralized configuration and management of physical and virtual network devices as well as dynamic and scalable implementation of network policies. The efficient processing of data traffic is important for maintaining scalability and efficient operation in such networks.

It is with respect to these considerations and others that the disclosure made herein is presented.

SUMMARY

A network such as a SDN may include one or more devices that process inbound and outbound packet traffic, transform the packets such as by applying policies to the packets, and forward the packets. Such processes may include applying a packet processing graph which may comprise, for example, checking the content against a series of tables or other data structures, pattern matching against each table, and so forth. It may be desirable to modify a device's packet processing graph to adapt to the packets that are being processed. For example, it may be desirable to optimize the graph for certain flows that are observed, or to apply transformations to those flows. However, the flows are typically not known in advance, and it is not feasible to program the graph ahead of time for all possible flows during runtime. Nevertheless, it is desirable to be able to dynamically change the content of the processing graph based on the contents of the received packets. For example, when a new flow starts (e.g., a flow defined by the source and destination address of a data packet), the device may modify some rows in some tables of the processing graph to treat that flow with specified rules that are applicable for that flow (e.g., perform network address translation). Such a process may include, for example, capturing a data packet, identifying the packet as the first packet of a flow, placing the packet in a queue, sending the packet to a processor, parsing the packet, identifying an action, determining which tables to modify, locking the tables, applying the changes, and forwarding the packet. Such processing can consume significant computing resources such as CPU cycles, memory resources, as well as introducing latency which can result in delays and/or missing subsequent data packets in the flow.

One challenge is to be able to make changes from within the packet processing pipeline of the software data plane without significantly impacting the device's throughput or latency. The present disclosure provides a way to rapidly implement changes to the packet processing graph. Various embodiments disclosed herein enable a rapid modification to the packet processing graph when a first packet of a flow is to be processed such that the tables are modified and configured to capture subsequent packets in the same flow without undue delay and thus avoid latency and possible packet loss.

Systems and methods are described for implementing a 'learn' action as an action that can be performed by packet processing pipeline threads and permitting the graph's processing pipeline to modify a software-data plane graph. This reduces the burden on the control thread, whose tasks can be performed prior to the graph modification. Pre-allocated resources may be provided to the packet processing pipeline to allow for efficient and rapid construction of new table rows. By focusing the control thread's role to pre-allocating resources to facilitate the self-modification of the graph, the packet processing pipeline can quickly self-modify without having to request additional system resources. In some embodiments, pre-allocated memory and resources such as port numbers may be provided when adding rules to the tables of the processing graph to process new flows. By providing a queue of pre-allocated memory and resources, the pre-allocated memory and resources may be quickly obtained and used when processing a new flow rather than generating the needed data structures and other resources on the fly.

The described techniques can allow for maintaining efficient use of computing resources such as processor cycles, memory, network bandwidth, and power. This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DRAWINGS

The Detailed Description is described with reference to the accompanying figures. In the description detailed herein, references are made to the accompanying drawings that form a part hereof, and that show, by way of illustration, specific embodiments or examples. The drawings herein are not drawn to scale. Like numerals represent like elements throughout the several figures.

DETAILED DESCRIPTION

Figure 1:
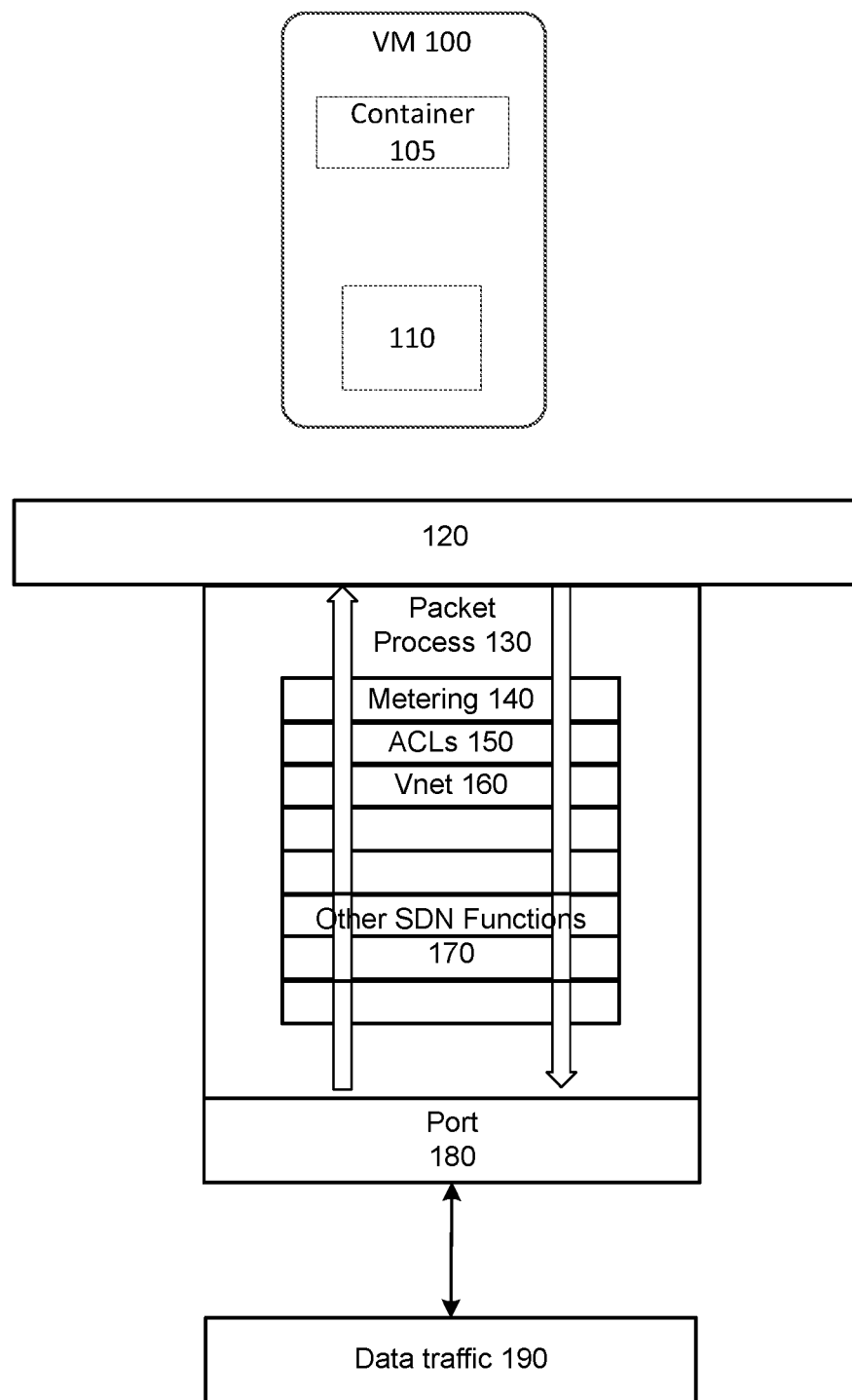
FIG. 1 is a diagram illustrating an example architecture in accordance with the present disclosure.

In various network scenarios, a packet networking device may operate on packets received from the network by applying a sequence of rules to the packet. FIG. 1 shows an example packet processing extension 130 for a network device 120 that applies various operations on packets, such as specific networking policies that are tied to container 105. The network device 120 may logically underly the NIC 110 and may provide a port 180 for each VM supported by the NIC 110. The packet processing extension 130 may apply policies and transform or tunnel data packets in a given computing workload that are entering and leaving the VM 100. The packet processing extension 130 may include a central data packet processor (not shown) that performs the processing of data packets. The packet processing layers may include, in this example, those relating to metering 140, access control lists (ACLs) 150, VNet addressing/routing 160, and other various SDN functions or features 170 which may include, for example, those pertaining to routing, tunneling, filtering, address translation, encryption, decryption, encapsulation, de-encapsulation, quality of service (QoS), and the like. The packet processor in the packet processing extension 130 may evaluate the packets of data traffic 190 as they traverse the networking policy layers, matching rules in each layer based on a state of the packet after an action is performed in the preceding layer. Returning packets may traverse the layers in the opposite direction and may be processed by the packet processing extension 130 to match the applicable rules. The rules used to express the networking policies may be entities that perform actions on matching packets (e. g., using a match action table model) as the computing workload is processed by the packet processing extension 130.

Packet processing rules are typically expressed in tables where the device examines specific bits within the packet and compares the values of those bits with the keys stored in the various rows in the table. The table rows may also contain actions to perform on packets that match against them and may indicate a subsequent table of rules to check. Different packets in general may visit a different sequence of tables. The collection of tables and the links between them may be referred to as the packet processing graph.

In some implementations, such as in a device with a hardware data plane, the graph may be fixed by the network processing units (NPUs) and packets may be processed through the graph by the NPUs without involvement by the device's central processing units (CPUs). This may provide one way to route packets quickly by using specialized hardware designed and optimized only for this purpose. However, in a device with a software data plane, packets may be processed through the graph by threads running on one or more of the device's CPUs which are dedicated to this purpose. These may be referred to as the packet processing pipeline threads. In such devices, the graph is often flexible and can be controlled by the application. This provides a way to route packets quickly by allowing for the graph to be customized to suit the application, thus making it more efficient at processing that application's traffic. This trades the efficiency of the specialized NPU for a process which efficiently uses the more flexible CPU resources, and thus does not require specialized (and expensive) hardware. As a benefit, with the advent of cloud-computing, when the network is under-load, additional CPUs can begin running as packet processing pipeline threads and scale up the network. The application may be any kind of device or application that is processing the packet, including, for example, media gateways, virtual resource applications, a user plane function in a 5G network, and the like.

In some implementations, the first packet in a flow may be identified and the first packet may be removed from the software or hardware-based pipeline to be handled by a separate control thread on another CPU. A flow may be a set of related packets, for example all TCP packets sent between a specific pair of IP addresses and ports, which tend to need the same actions to be performed on them. The control thread analyzes the packet, constructs the changes required to the graph, and applies those changes to the graph. This may consume significant processing overhead and introduce delays. The packet must typically wait in a queue before being processed by the control thread. The control thread must then analyze the packet's properties and which part of the graph intercepted it. The control thread then creates a new part of the graph and must then wait for a lock on the graph to impose the changes. The amount of processing required to perform these operations can be significant and the resulting delay may prevent subsequent packets in the flow from being processed before the required change to the graph is in place.

In a software data plane, it is possible to achieve a faster modification to the data plane from within the pipeline thread using the disclosed techniques. The present disclosure addresses the shortcomings noted above by providing fast and efficient techniques for enabling a self-modifying packet processing graph.

In various embodiments disclosed herein, the pipeline thread may take prefabricated or prepopulated segments of the graph from a queue when the thread processes a graph-changing packet. The segments may be modified to contain relevant information from the packet and then inserted into appropriate points of the packet processing graph. A learn action in the graph provides a template for these prefabricated segments. The graph modification may be performed within the pipeline thread since it involves only a few pointer swap operations.

The learn action may be an action, such as those already populated in the graph and that define how the graph can process packets, where the learn action defines the modifications that the graph can make to itself. The learn action specifies a set of tables that are to be modified because of the processing of the learn action and provides a template for a row to add to each table. The application implements the learn action to describe the modifications that are to be made to the graph.

The application may insert a learn action into any row of any table in the graph. Any packet that is applied to one of those rows may trigger the learn action to insert new rows into the indicated tables using corresponding templates that are associated with the resource that is to be built. The learn actions may be different depending on the particular application. The learn action may include parameters particular to the application that are necessary to enable the graph to modify itself using the learn action.

Figure 2:
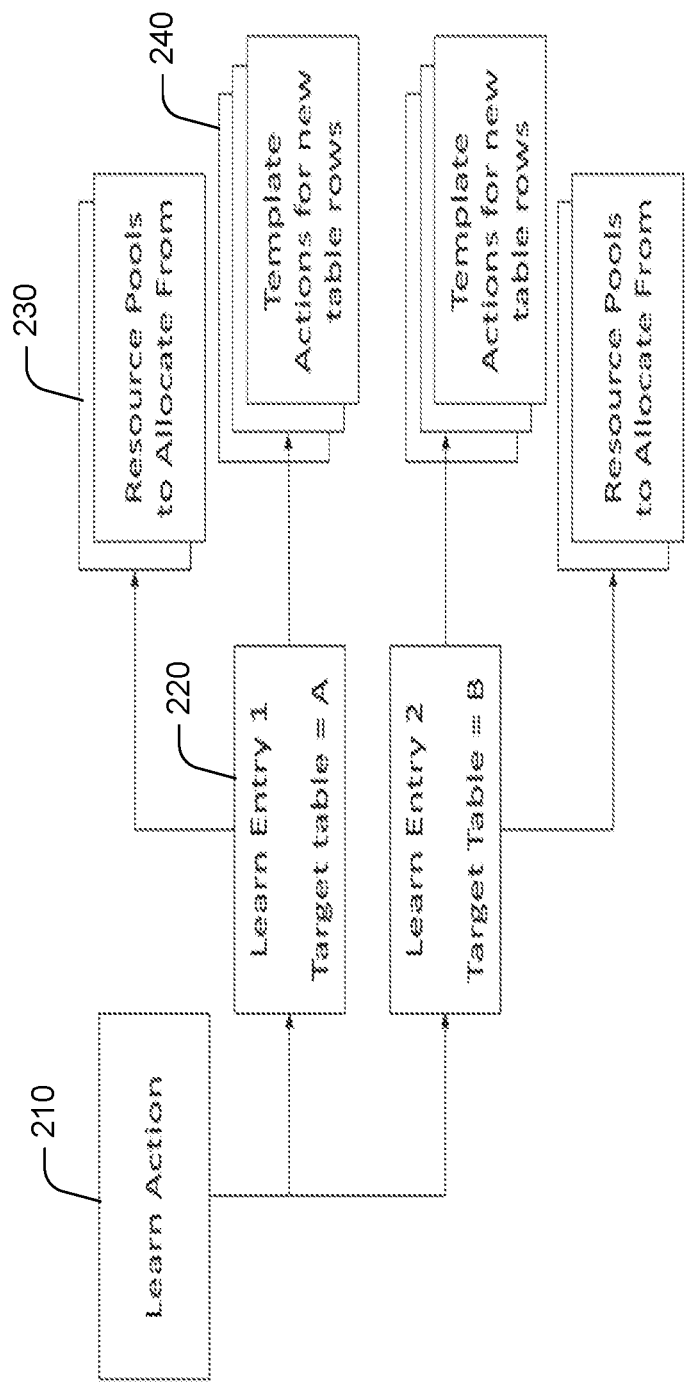
FIG. 2 is a diagram illustrating a graph modification in accordance with the present disclosure.

In an embodiment, the learn action may comprise a list of learn entries. Referring to FIG. 2, illustrated is an example structure of a learn action 210 that specifies a set of tables that are to be modified because of the processing of the learn action 210 and templates for a row to add to each table. Referring to FIG. 2, a learn entry 220 may contain:

The name of a table to modify.

A rule for extracting a key from the packet that triggers the learn action for each new table row that is generated.

Anile to identify a set of resource pools 230 to allocate objects, identifiers, and other predetermined information to be associated with a flow (such as system memory) from. The resource pool identifiers are extracted from the packet that triggers the learn action using this rule.

A set of template actions 240 to insert into each new table row that is generated. The generated actions may contain fields that are extracted from the packet that triggers the learn action, or they may contain fields that use the resources allocated above.

In an embodiment, new parts of the graph may be constructed by the pipeline using pre-allocated structures such as table rows which include not only memory allocations but may be formatted data structures. The pre-allocated resources may include not only memory allocations but may be formatted so that the fields in the memory are already filled in with the information needed so that the data plane does not have to initialize the memory and fill in the information. In general, the pre-allocated resources may include pre-built objects that the data plane may add to the data structure.

Figure 3:
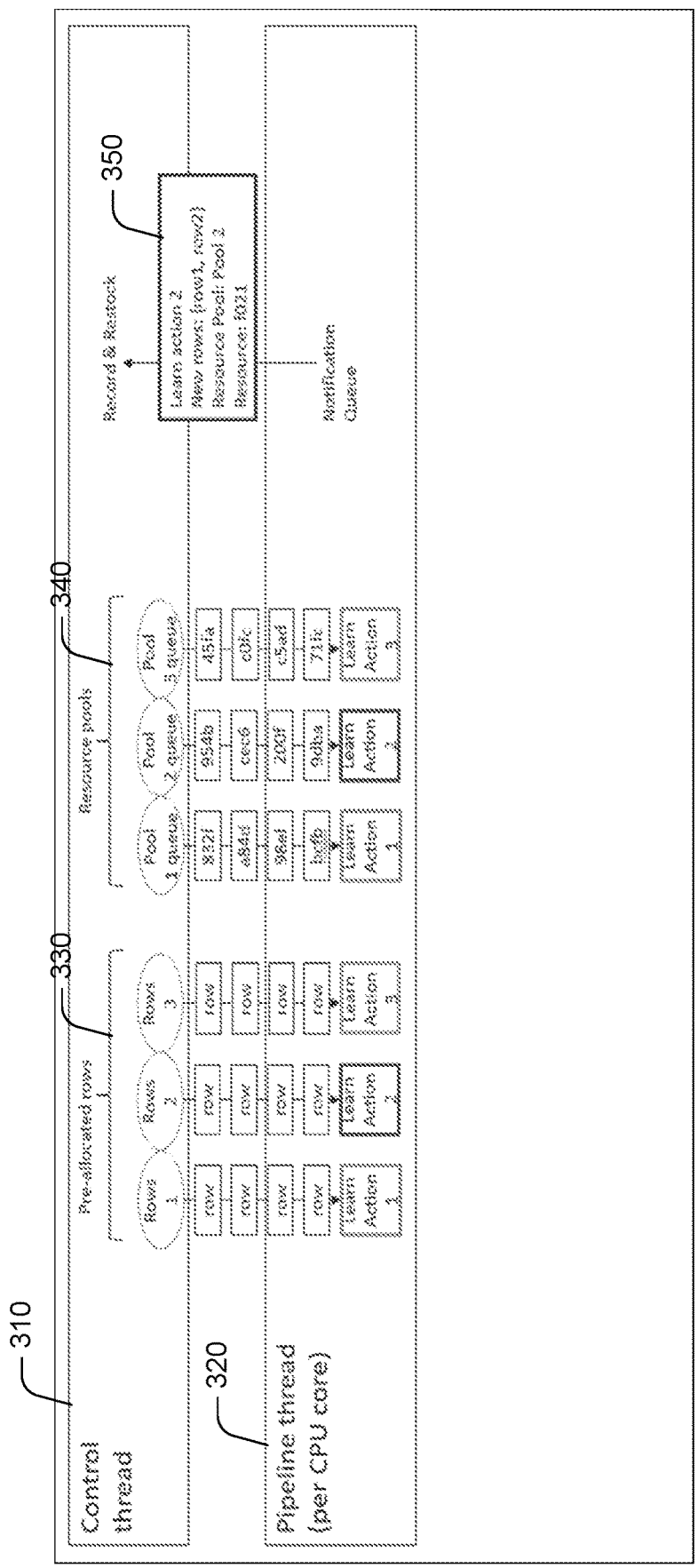
FIG. 3 is a diagram illustrating a graph modification in accordance with the present disclosure.

FIG. 3 illustrates an example showing pre-allocated rows, resource pools, and the use of queues. In one embodiment, a control thread 310 on a separate CPU core from the pipeline thread 320 may prefabricate entire table rows 330 and pre-allocate resources from each of the resource pools 340. The resource pools 340 may include, for example, objects or identifiers that may be needed for processing a given flow. The pipeline thread 320 thus has access to readily available resources without having to generate the resources or initiate processes to generate the resources.

For example, when a new flow is identified, a new and unique port ID may need to be assigned. A port ID may be, for example, a 16-bit number that is needed as part of network address translation. To avoid having the data plane manage port IDs, a number of unique port IDs may be pre-allocated in resource pools so that a processing thread can use the next available port ID from the resource pool. Thus, a learn action may define a pool of port numbers (e.g., from 0 to 64K) which can be drawn upon when creating a new flow and programmed in the processing graph. When the flow is terminated, the port ID may be returned to the pool. In this example, the pre-built templates can include the action to rewrite the port number, which can be populated from the resource pool when new rows are actually built. The port ID assigned to the flow is unique within a particular group of flows (not necessarily unique across all flows). The learn action may define one pool of port IDs per group. Each one of these pools contains the full range of 64K port numbers because flows in different groups may use the same port ID. A field within the packet may determine which group the flow belongs to and indicates to the learn action which pool to take a port ID from.

For each learn action that the application provisions, a set of first-in first-out (FIFO) queues may be created between the control thread and each CPU core that is running a pipeline thread. One queue may be implemented for the prefabricated table rows (comprising the appropriate set of actions for each learn entry) and one queue may be implemented for each resource pool. The control thread may populate these queues with prefabricated table rows and pre-allocated resources from each pool. When a pipeline thread processes a learn action, the thread may take any required prefabricated table rows and any required resources from the queues, fill in any details in the table rows from the packet in hand and the resources acquired, and insert the rows into the appropriate tables. This operation may be performed quickly because it does not involve any memory allocation or resource space management.

A FIFO queue 350 may be implemented between each pipeline CPU core and the control CPU core. These queues may be used to notify the control thread of the new rows that have been added to the tables by the pipeline and the resources that are now associated with those rows. When a pipeline thread adds a set of new rows because of processing a learn action, the pipeline thread may also add a notification to this queue describing the new rows and their resources. The control thread consumes the items on this queue by polling the queue. When the control thread receives a notification, the control thread replenishes any gaps in the corresponding queues of prefabricated rows and pre-allocated resources. The control thread also creates a state to track the existence of these rows. This allows the control thread to manage the lifecycle of these rows, for example by deleting rows if they are no longer being used, and releasing the resources associated with the rows back to the relevant pools.

In an alternative embodiment, pipeline threads could instead own a pool of their own pre-allocated (but not prefabricated) table rows with sufficient space for a generic set of actions. The table rows would then be built (but not allocated) from within the pipeline thread by customizing these actions to fit the learn action that is being processed.

Figure 4:
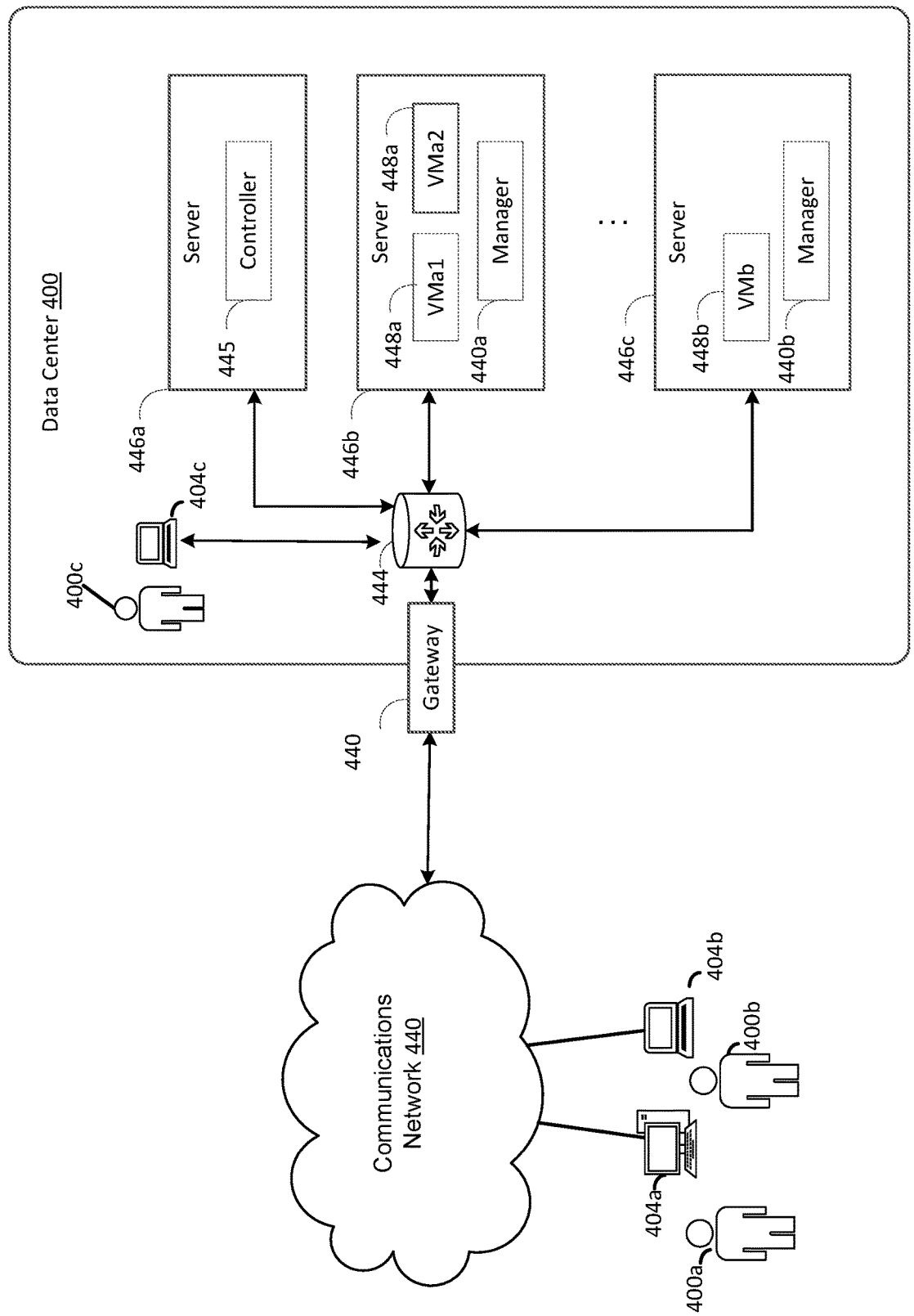
FIG. 4 is a flowchart depicting an example computing environment in accordance with the present disclosure.

FIG. 4 illustrates an example computing environment in which the embodiments described herein may be implemented. FIG. 4 illustrates a data center 400 that is configured to provide computing resources to users 400*a*, 400*b*, or 400*c* (which may be referred herein singularly as "a user 400" or in the plural as "the users 400") via user computers 404*a*, 404*b*, and 404*c* (which may be referred herein singularly as "a computer 404" or in the plural as "the computers 404") via a communications network 440. The computing resources provided by the data center 400 may include various types of resources, such as computing resources, data storage resources, data communication resources, and the like. Each type of computing resource may be general-purpose or may be available in a number of specific configurations. For example, computing resources may be available as virtual machines. The virtual machines may be configured to execute applications, including Web servers, application servers, media servers, database servers, and the like. Data storage resources may include file storage devices, block storage devices, and the like. Each type or configuration of computing resource may be available in different configurations, such as the number of processors, and size of memory and/or storage capacity. The resources may in some embodiments be offered to clients in units referred to as instances, such as virtual machine instances or storage instances. A virtual computing instance may be referred to as a virtual machine and may, for example, comprise one or more servers with a specified computational capacity (which may be specified by indicating the type and number of CPUs, the main memory size and so on) and a specified software stack (e.g., a particular version of an operating system, which may in turn run on top of a hypervisor).

Data center 400 may correspond to data center 100 and 110 of FIG. 2. Data center 400 may include servers 446*a*, 446*b*, and 446*c* (which may be referred to herein singularly as "a server 446" or in the plural as "the servers 446") that may be standalone or installed in server racks, and provide computing resources available as virtual machines 448*a* and 448*b* (which may be referred to herein singularly as "a virtual machine 448" or in the plural as "the virtual machines 448"). The virtual machines 448 may be configured to execute applications such as Web servers, application servers, media servers, database servers, and the like. Other resources that may be provided include data storage resources (not shown on FIG. 4) and may include file storage devices, block storage devices, and the like. Servers 446 may also execute functions that manage and control allocation of resources in the data center, such as a controller 445. Controller 445 may be a fabric controller or another type of program configured to manage the allocation of virtual machines on servers 446.

Referring to FIG. 4, communications network 440 may, for example, be a publicly accessible network of linked networks and may be operated by various entities, such as the Internet. In other embodiments, communications network 440 may be a private network, such as a corporate network that is wholly or partially inaccessible to the public.

Communications network 440 may provide access to computers 404. Computers 404 may be computers utilized by users 400. Computer 404*a*, 404*b* or 404*c* may be a server, a desktop or laptop personal computer, a tablet computer, a smartphone, a set-top box, or any other computing device capable of accessing data center 400. User computer 404*a* or 404*b* may connect directly to the Internet (e.g., via a cable modem). User computer 404*c* may be internal to the data center 400 and may connect directly to the resources in the data center 400 via internal networks. Although only three user computers 404*a*, 404*b*, and 404*c* are depicted, it should be appreciated that there may be multiple user computers.

Computers 404 may also be utilized to configure aspects of the computing resources provided by data center 400. For example, data center 400 may provide a Web interface through which aspects of its operation may be configured through the use of a Web browser application program executing on user computer 404. Alternatively, a stand-alone application program executing on user computer 404 may be used to access an application programming interface (API) exposed by data center 400 for performing the configuration operations.

Servers 446 may be configured to provide the computing resources described above. One or more of the servers 446 may be configured to execute a manager 440*a* or 440*b* (which may be referred herein singularly as "a manager 440" or in the plural as "the managers 440") configured to execute the virtual machines. The managers 440 may be a virtual machine monitor (VMM), fabric controller, or another type of program configured to enable the execution of virtual machines 448 on servers 446, for example.

It should be appreciated that although the embodiments disclosed above are discussed in the context of virtual machines, other types of implementations can be utilized with the concepts and technologies disclosed herein.

In the example data center 400 shown in FIG. 4, a network device 444 may be utilized to interconnect the servers 446*a* and 446*b*. Network device 444 may comprise one or more switches, routers, or other network devices. Network device 444 may also be connected to gateway 440, which is connected to communications network 440. Network device 444 may facilitate communications within networks in data center 400, for example, by forwarding packets or other data communications as appropriate based on characteristics of such communications (e.g., header information including source and/or destination addresses, protocol identifiers, etc.) and/or the characteristics of the private network (e.g., routes based on network topology, etc.). It will be appreciated that, for the sake of simplicity, various aspects of the computing systems and other devices of this example are illustrated without showing certain conventional details. Additional computing systems and other devices may be interconnected in other embodiments and may be interconnected in different ways.

It should be appreciated that the network topology illustrated in FIG. 4 has been greatly simplified and that many more networks and networking devices may be utilized to interconnect the various computing systems disclosed herein. These network topologies and devices should be apparent to those skilled in the art.

It should also be appreciated that data center 400 described in FIG. 4 is merely illustrative and that other implementations might be utilized. Additionally, it should be appreciated that the functionality disclosed herein might be implemented in software, hardware or a combination of software and hardware. Other implementations should be apparent to those skilled in the art. It should also be appreciated that a server, gateway, or other computing device may comprise any combination of hardware or software that can interact and perform the described types of functionality, including without limitation desktop or other computers, database servers, network storage devices and other network devices, PDAs, tablets, smartphone, Internet appliances, television-based systems (e.g., using set top boxes and/or personal/digital video recorders), and various other consumer products that include appropriate communication capabilities. In addition, the functionality provided by the illustrated modules may in some embodiments be combined in fewer modules or distributed in additional modules. Similarly, in some embodiments the functionality of some of the illustrated modules may not be provided and/or other additional functionality may be available.

Figure 5A:
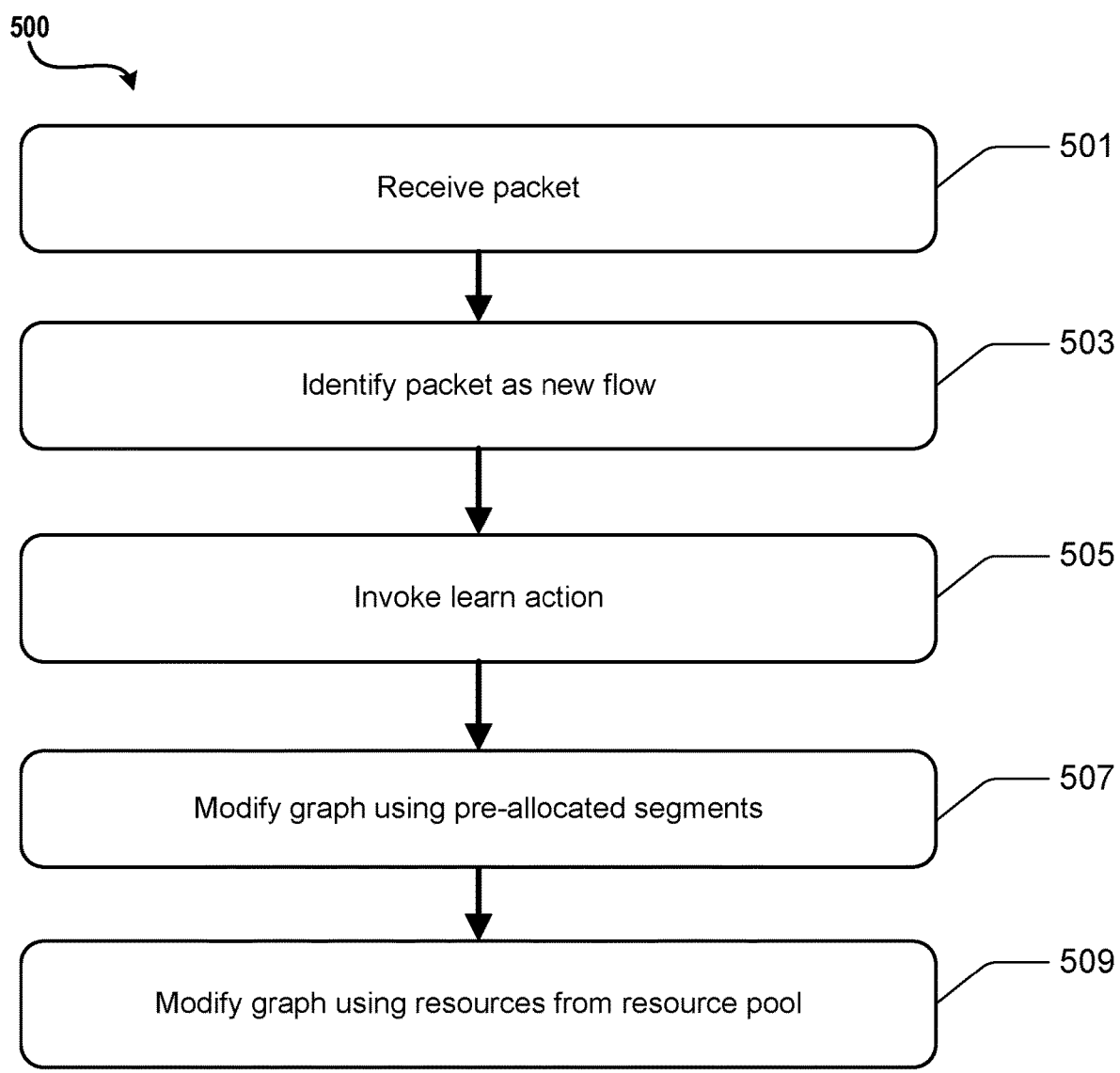
FIG. 5A is a flowchart depicting an example procedure in accordance with the present disclosure.

Turning now to FIG. 5A, illustrated is an example operational procedure for modifying a processing graph in accordance with the present disclosure. Referring to FIG. 5, operation 501 illustrates receiving a data packet from the network. Operation 501 may be followed by operation 503. Operation 503 illustrates identifying the packet as a new flow. Operation 503 may be followed by operation 505. Operation 505 illustrates initiating a learn action based on the packet contents. Operation 505 may be followed by operation 507. Operation 507 illustrates modifying the processing graph using one or more pre-allocated segments. Operation 507 may be followed by operation 509. Operation 509 illustrates modifying the processing graph using one or more resources from the resource pool. The operations need not be executed separately and may be combined.

Figure 5B:
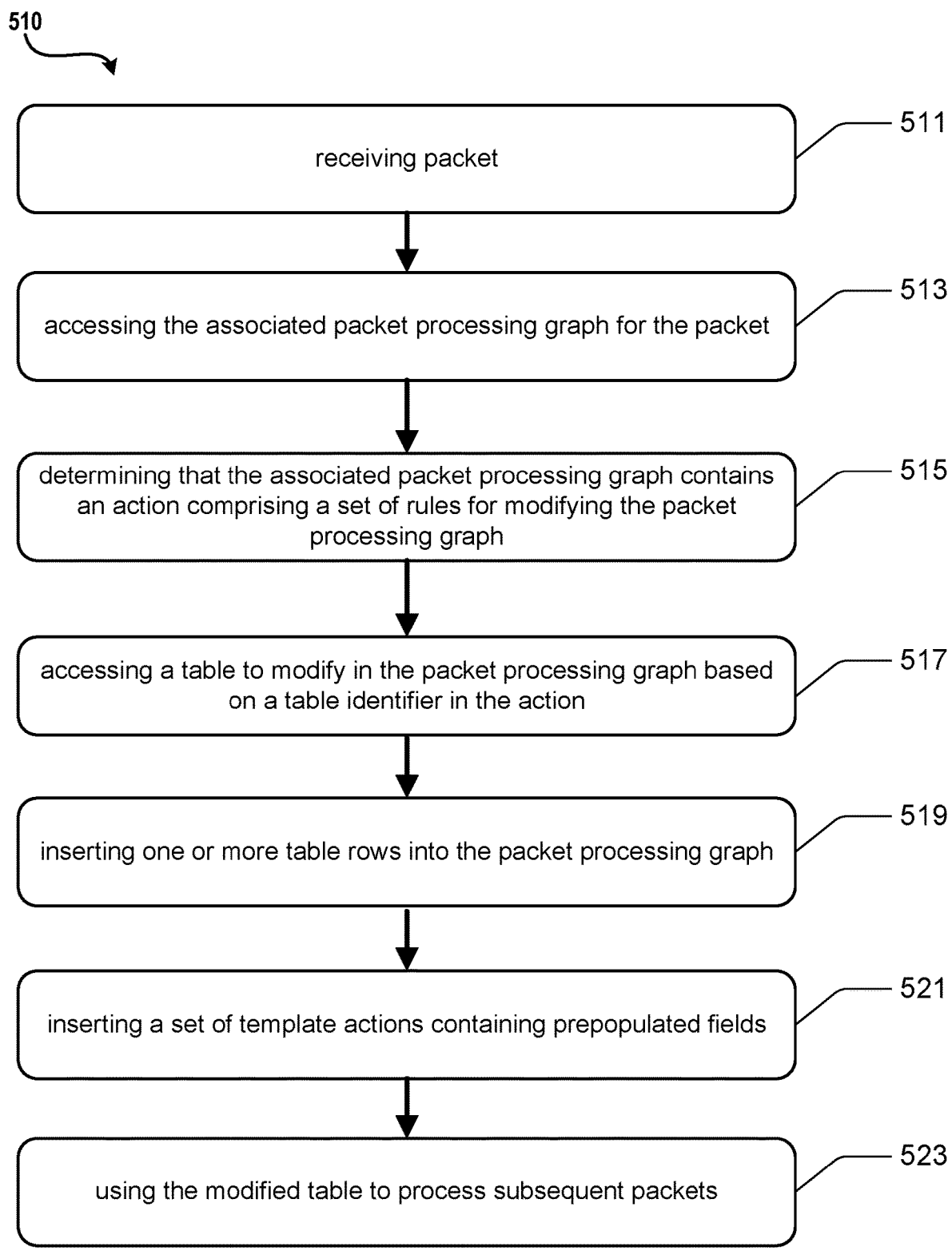
FIG. 5B is a flowchart depicting an example procedure in accordance with the present disclosure.

Turning now to FIG. 5B, illustrated is an example operational procedure for runtime modification of packet processing graphs in a communications network comprising a user plane for communicating data packets between endpoints, and a control plane for managing communication of the data packets in the communications network. In an embodiment, the user plane executes one or more packet processing pipeline threads configured to process incoming packets and the control plane executes one or more control threads. Such an operational procedure can be provided by one or more components illustrated in FIGS. 1 through 4. The operational procedure may be implemented in a system comprising one or more computing devices. It should be understood by those of ordinary skill in the art that the operations of the methods disclosed herein are not necessarily presented in any particular order and that performance of some or all of the operations in an alternative order(s) is possible and is contemplated. The operations have been presented in the demonstrated order for ease of description and illustration. Operations may be added, omitted, performed together, and/or performed simultaneously, without departing from the scope of the appended claims.

It should also be understood that the illustrated methods can end at any time and need not be performed in their entireties. Some or all operations of the methods, and/or substantially equivalent operations, can be performed by execution of computer-readable instructions included on a computer-storage media, as defined herein. The term "computer-readable instructions," and variants thereof, as used in the description and claims, is used expansively herein to include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, and the like.

It should be appreciated that the logical operations described herein are implemented (1) as a sequence of computer implemented acts or program modules running on a computing system such as those described herein) and/or (2) as interconnected machine logic circuits or circuit modules within the computing system. The implementation is a matter of choice dependent on the performance and other requirements of the computing system. Accordingly, the logical operations may be implemented in software, in firmware, in special purpose digital logic, and any combination thereof. Thus, although the routine 300 is described as running on a system, it can be appreciated that the routine 300 and other operations described herein can be executed on an individual computing device or several devices.

Referring to FIG. 5B, operation 511 illustrates receiving, by a packet processing pipeline thread, a packet for processing based on a match to an associated packet processing graph comprising one or more tables containing rules that are applicable for a flow associated with the packet.

Operation 511 may be followed by operation 513. Operation 513 illustrates accessing, by the packet processing pipeline thread, the associated packet processing graph for the packet.

Operation 513 may be followed by operation 515. Operation 515 illustrates determining, by the packet processing pipeline thread, that the associated packet processing graph contains an action comprising a set of rules for modifying the packet processing graph while processing the packet.

Operation 515 may be followed by operation 517. Operation 517 illustrates accessing, by the packet processing pipeline thread, a table to modify in the packet processing graph based on a table identifier in the action.

Operation 517 may be followed by operation 519. Operation 519 illustrates modifying, by the packet processing pipeline thread while processing the packet, the accessed table by inserting one or more table rows into the associated packet processing graph, the table rows containing actions to be performed on the packet.

Operation 519 may be followed by operation 521. Operation 521 illustrates modifying, by the packet processing pipeline thread while processing the packet, the accessed table by, for each inserted table row, inserting a set of template actions containing prepopulated fields that define actions to be performed on the packet.

Operation 521 may be followed by operation 523. Operation 523 illustrates using, by the packet processing pipeline thread, the modified table to process subsequent packets.

The various aspects of the disclosure are described herein with regard to certain examples and embodiments, which are intended to illustrate but not to limit the disclosure. It should be appreciated that the subject matter presented herein may be implemented as a computer process, a computer-controlled apparatus, a computing system, an article of manufacture, such as a computer-readable storage medium, or a component including hardware logic for implementing functions, such as a field-programmable gate array (FPGA) device, a massively parallel processor array (MPPA) device, a graphics processing unit (GPU), an application-specific integrated circuit (ASIC), a multiprocessor System-on-Chip (MPSoC), etc. A component may also encompass other ways of leveraging a device to perform a function, such as, for example, a) a case in which at least some tasks are implemented in hard ASIC logic or the like; b) a case in which at least some tasks are implemented in soft (configurable) FPGA logic or the like; c) a case in which at least some tasks run as software on FPGA software processor overlays or the like; d) a case in which at least some tasks run as software on hard ASIC processors or the like, etc., or any combination thereof. A component may represent a homogeneous collection of hardware acceleration devices, such as, for example, FPGA devices. On the other hand, a component may represent a heterogeneous collection of different types of hardware acceleration devices including different types of FPGA devices having different respective processing capabilities and architectures, a mixture of FPGA devices and other types hardware acceleration devices, etc.

Figure 6:
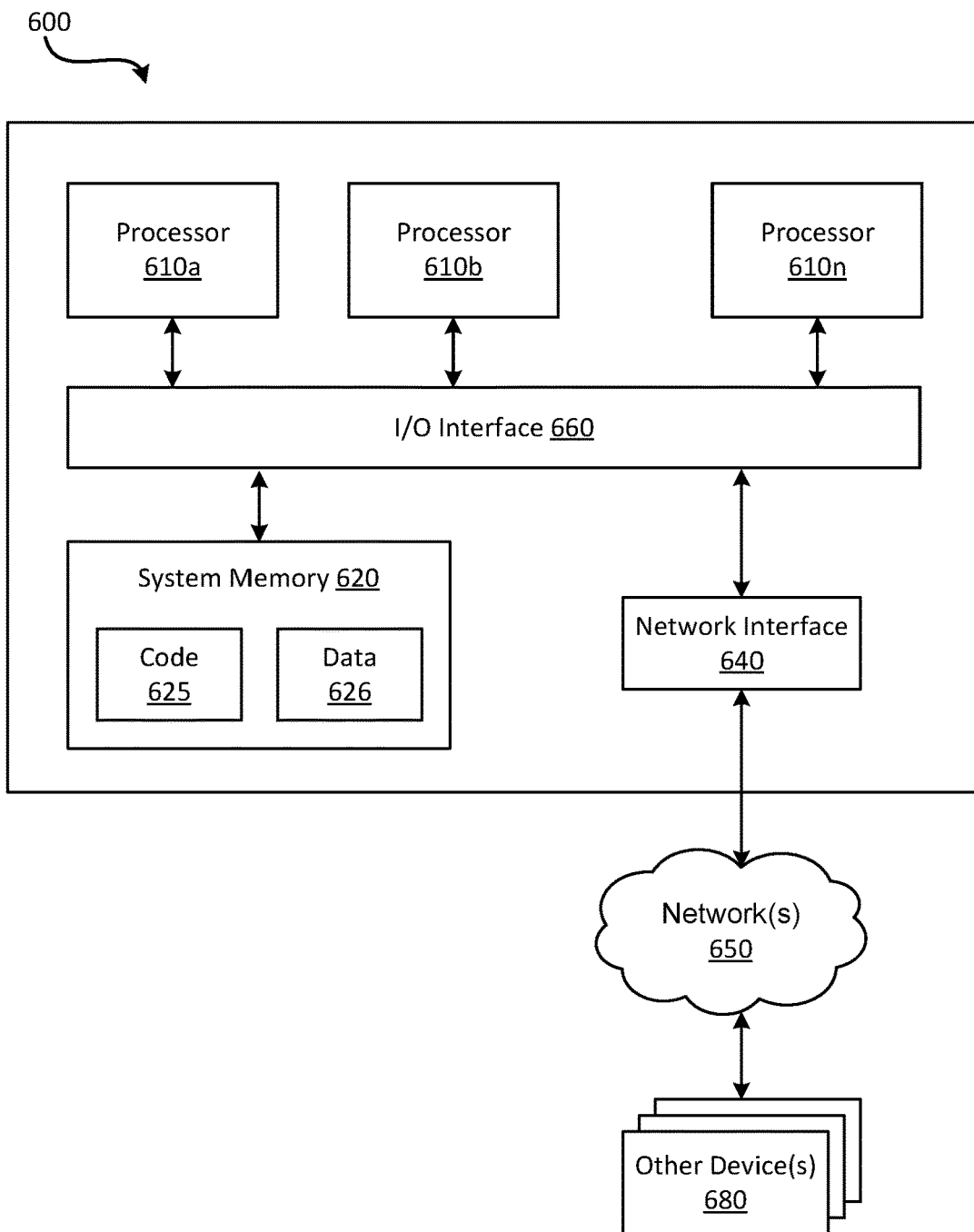
FIG. 6 is an example computing device in accordance with the present disclosure.

FIG. 6 illustrates a general-purpose computing device 600. In the illustrated embodiment, computing device 600 includes one or more processors 610a, 610b, and/or 610n (which may be referred herein singularly as "a processor 610" or in the plural as "the processors 610") coupled to a system memory 66 via an input/output (I/O) interface 630. Computing device 600 further includes a network interface 640 coupled to I/O interface 630.

In various embodiments, computing device 600 may be a uniprocessor system including one processor 610 or a multiprocessor system including several processors 610 (e.g., two, four, eight, or another suitable number). Processors 610 may be any suitable processors capable of executing instructions. For example, in various embodiments, processors 610 may be general-purpose or embedded processors implementing any of a variety of instruction set architectures (ISAs), such as the x86, PowerPC, SPARC, or MIPS ISAs, or any other suitable ISA. In multiprocessor systems, each of processors 610 may commonly, but not necessarily, implement the same ISA.

System memory 66 may be configured to store instructions and data accessible by processor(s) 610. In various embodiments, system memory 66 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing one or more desired functions, such as those methods, techniques and data described above, are shown stored within system memory 620 as code 625 and data 626.

In one embodiment, I/O interface 630 may be configured to coordinate I/O traffic between the processor 610, system memory 66, and any peripheral devices in the device, including network interface 640 or other peripheral interfaces. In some embodiments, I/O interface 630 may perform any necessary protocol, timing, or other data transformations to convert data signals from one component (e.g., system memory 620) into a format suitable for use by another component (e.g., processor 610). In some embodiments, I/O interface 630 may include support for devices attached through various types of peripheral buses, such as a variant of the Peripheral Component Interconnect (PCI) bus standard or the Universal Serial Bus (USB) standard, for example. In some embodiments, the function of I/O interface 630 may be split into two or more separate components.

Also, in some embodiments some or all of the functionality of I/O interface 630, such as an interface to system memory 620, may be incorporated directly into processor 610.

Network interface 640 may be configured to allow data to be exchanged between computing device 600 and other device or devices 660 attached to a network or network(s) 660, such as other computer systems or devices as illustrated in FIGS. 1 through 5, for example. In various embodiments, network interface 640 may support communication via any suitable wired or wireless general data networks, such as types of Ethernet networks, for example. Additionally, network interface 640 may support communication via telecommunications/telephony networks such as analog voice networks or digital fiber communications networks, via storage area networks such as Fibre Channel SANs or via any other suitable type of network and/or protocol.

In some embodiments, system memory 620 may be one embodiment of a computer-accessible medium configured to store program instructions and data as described above for FIGS. 1-5 for implementing embodiments of the corresponding methods and apparatus. However, in other embodiments, program instructions and/or data may be received, sent or stored upon different types of computer-accessible media. A computer-accessible medium may include non-transitory storage media or memory media, such as magnetic or optical media, e.g., disk or DVD/CD coupled to computing device 600 via I/O interface 630. A non-transitory computer-accessible storage medium may also include any volatile or non-volatile media, such as RAM (e.g. SDRAM, DDR SDRAM, RDRAM, SRAM, etc.), ROM, etc., that may be included in some embodiments of computing device 600 as system memory 620 or another type of memory. Further, a computer-accessible medium may include transmission media or signals such as electrical, electromagnetic or digital signals, conveyed via a communication medium such as a network and/or a wireless link, such as may be implemented via network interface 640. Portions or all of multiple computing devices, such as those illustrated in FIG. 6, may be used to implement the described functionality in various embodiments; for example, software components running on a variety of different devices and servers may collaborate to provide the functionality. In some embodiments, portions of the described functionality may be implemented using storage devices, network devices, or special-purpose computer systems, in addition to or instead of being implemented using general-purpose computer systems. The term "computing device," as used herein, refers to at least all these types of devices and is not limited to these types of devices.

Various storage devices and their associated computer-readable media provide non-volatile storage for the computing devices described herein. Computer-readable media as discussed herein may refer to a mass storage device, such as a solid-state drive, a hard disk or CD-ROM drive. However, it should be appreciated by those skilled in the art that computer-readable media can be any available computer storage media that can be accessed by a computing device.

By way of example, and not limitation, computer storage media may include volatile and non-volatile, removable and non-removable media implemented in any method or technology for storage of information such as computer-readable instructions, data structures, program modules or other data. For example, computer media includes, but is not limited to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other medium which can be used to store the desired information and which can be accessed by the computing devices discussed herein. For purposes of the claims, the phrase "computer storage medium," "computer-readable storage medium" and variations thereof, does not include waves, signals, and/or other transitory and/or intangible communication media, per se.

Encoding the software modules presented herein also may transform the physical structure of the computer-readable media presented herein. The specific transformation of physical structure may depend on various factors, in different implementations of this description. Examples of such factors may include, but are not limited to, the technology used to implement the computer-readable media, whether the computer-readable media is characterized as primary or secondary storage, and the like. For example, if the computer-readable media is implemented as semiconductor-based memory, the software disclosed herein may be encoded on the computer-readable media by transforming the physical state of the semiconductor memory. For example, the software may transform the state of transistors, capacitors, or other discrete circuit elements constituting the semiconductor memory. The software also may transform the physical state of such components in order to store data thereupon.

As another example, the computer-readable media disclosed herein may be implemented using magnetic or optical technology. In such implementations, the software presented herein may transform the physical state of magnetic or optical media, when the software is encoded therein. These transformations may include altering the magnetic characteristics of particular locations within given magnetic media. These transformations also may include altering the physical features or characteristics of particular locations within given optical media, to change the optical characteristics of those locations. Other transformations of physical media are possible without departing from the scope and spirit of the present description, with the foregoing examples provided only to facilitate this discussion.

In light of the above, it should be appreciated that many types of physical transformations take place in the disclosed computing devices in order to store and execute the software components and/or functionality presented herein. It is also contemplated that the disclosed computing devices may not include all of the illustrated components shown in FIG. 8, may include other components that are not explicitly shown in FIG. 6, or may utilize an architecture completely different than that shown in FIG. 6.

Although the various configurations have been described in language specific to structural features and/or methodological acts, it is to be understood that the subject matter defined in the appended representations is not necessarily limited to the specific features or acts described. Rather, the specific features and acts are disclosed as example forms of implementing the claimed subject matter.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without author input or prompting, whether these features, elements, and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

While certain example embodiments have been described, these embodiments have been presented by way of example only, and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

It should be appreciated any reference to "first," "second," etc. items and/or abstract concepts within the description is not intended to and should not be construed to necessarily correspond to any reference of "first," "second," etc. elements of the claims. In particular, within this Summary and/or the following Detailed Description, items and/or abstract concepts such as, for example, individual computing devices and/or operational states of the computing cluster may be distinguished by numerical designations without such designations corresponding to the claims or even other paragraphs of the Summary and/or Detailed Description. For example, any designation of a "first operational state" and "second operational state" of the computing cluster within a paragraph of this disclosure is used solely to distinguish two different operational states of the computing cluster within that specific paragraph—not any other paragraph and particularly not the claims.

In closing, although the various techniques have been described in language specific to structural features and/or methodological acts, it is to be understood that the subject matter defined in the appended representations is not necessarily limited to the specific features or acts described. Rather, the specific features and acts are disclosed as example forms of implementing the claimed subject matter.

The disclosure presented herein also encompasses the subject matter set forth in the following clauses:

Clause 1: A machine-implemented method for runtime modification of packet processing graphs in a communications network comprising a user plane for communicating data packets between endpoints, and a control plane for managing communication of the data packets in the communications network, wherein the user plane executes one or more packet processing pipeline threads configured to process incoming packets and the control plane executes one or more control threads, the method comprising:
  receiving, by a packet processing pipeline thread, a packet for processing based on a match to an associated packet processing graph comprising one or more tables containing rules that are applicable for a flow associated with the packet;
  accessing, by the packet processing pipeline thread, the associated packet processing graph for the packet;
  determining, by the packet processing pipeline thread, that the associated packet processing graph contains an action comprising a set of rules for modifying the packet processing graph while processing the packet;
  accessing, by the packet processing pipeline thread, a table to modify in the packet processing graph based on a table identifier in the action;
  modifying, by the packet processing pipeline thread while processing the packet, the accessed table by:
    inserting one or more table rows into the associated packet processing graph, the table rows containing actions to be performed on the packet;
    for each inserted table row, inserting a set of template actions containing prepopulated fields that define actions to be performed on the packet; and
  using, by the packet processing pipeline thread, the modified table to process subsequent packets.

Clause 2: The method of clause 1, wherein the action comprises a rule for extracting a key from the packet that triggers the action.

Clause 3: The method of any of clauses 1-2, wherein the action comprises a rule for identifying a set of resource pools from which to allocate resources for the modified packet processing graph.

Clause 4: The method of any of clauses 1-3, wherein the template actions contain fields that use the allocated resources.

Clause 5: The method of any of clauses 1-4, further comprising instantiating a set of queues between the control threads and each CPU core that is running a packet processing pipeline thread.

Clause 6: The method of any of clauses 1-5, wherein the instantiated queues comprise a first queue for prepopulated table rows comprising a set of actions for each entry, and a second queue for each resource pool.

Clause 7: The method of clauses 1-6, wherein the control threads prepopulate the table rows and pre-allocate resources from each of the resource pools.

Clause 8: The method of any of clauses 1-7, wherein the packet processing pipeline threads read prepopulated table rows and resources from the queues, inserts data in the prepopulated table rows from the packet and the resources, and insert rows into tables.

Clause 9: The method of any of clauses 1-8, further comprising instantiating a set of queues between a processing core running the packet processing pipeline threads and a control core running the control threads, the set of queues configured to notify the control threads of added table rows and resources that are associated with the added rows.

Clause 10: The method of any of clauses 1-9, further comprising adding a notification to the set of queues describing the added rows and associated resources, wherein the control threads replenish any gaps in corresponding queues of prepopulated rows and pre-allocated resources.

Clause 11: The method of any of clauses 1-10, further comprising maintaining, by the control threads, a state for tracking the inserted rows.

Clause 12: The method of any of clauses 1-11, wherein the control threads delete rows that are no longer being used and release associated resources to the resource pools.

Clause 13: A system comprising:
  one or more data processing units;
  a computer-readable medium having encoded thereon computer-executable instructions to cause the one or more data processing units to execute a packet processing pipeline thread of a user plane of a communications network, the packet processing pipeline thread configured to perform operations comprising:
receiving a packet being communicated between two endpoints of the communications network;
determining an associated packet processing graph for the packet;
determining that the associated packet processing graph contains an action comprising a set of rules for modifying the packet processing graph;
accessing a table to modify in the packet processing graph based on a table identifier in the action;
modifying the accessed table by:
inserting one or more table rows into the packet processing graph;
for each inserted table row, inserting a set of template actions containing prepopulated fields; and
using the modified table to process subsequent packets.

Clause 14: The system of clause 13, wherein the action comprises a rule for extracting a key from the packet that triggers the action.

Clause 15: The system of any clauses 13-14, wherein the action comprises a rule for identifying a set of resource pools from which to allocate resources for the modified packet processing graph.

Clause 16: A computer-readable medium having encoded thereon computer-executable instructions that, when executed, cause one or more processing units of a computing device to execute operations comprising:
receiving, by a packet processing pipeline thread of a user plane for communicating data packets between endpoints of a communications network, a packet to process;
determining, by the packet processing pipeline thread, an associated packet processing graph for the packet;
determining, by the packet processing pipeline thread, that the associated packet processing graph contains an action comprising a set of rules for modifying the packet processing graph;
accessing, by the packet processing pipeline thread, a table to modify in the packet processing graph based on a table identifier in the action;
modifying, by the packet processing pipeline thread, the accessed table by:
inserting one or more table rows into the packet processing graph;
for each inserted table row, inserting a set of template actions containing prepopulated fields; and
using, by the packet processing pipeline thread, the modified table to process subsequent packets.

Clause 17: The computer-readable storage medium of clause 16, wherein the action comprises a rule for identifying a set of resource pools from which to allocate resources for the modified packet processing graph, further comprising computer-executable instructions that, when executed, cause one or more processing units of a computing device to execute operations comprising instantiating a set of queues between one or more control threads and each CPU core that is running a packet processing pipeline thread.

Clause 18: The computer-readable storage medium of any of clauses 16 and 17, wherein the instantiated queues comprise a first queue for prepopulated table rows comprising a set of actions for each entry, and a second queue for each resource pool.

Clause 19: The computer-readable storage medium of any of the clauses 16-18, wherein the control threads prepopulate the table rows and pre-allocate resources from each of the resource pools.

Clause 20: The computer-readable storage medium of any of the clauses 16-19, wherein the packet processing pipeline threads read prepopulated table rows and resources from the queues, inserts data in the prepopulated table rows from the packet and the resources, and insert rows into tables.

What is claimed is:

1. A machine-implemented method for runtime modification of packet processing graphs in a communications network comprising a user plane for communicating data packets between endpoints, and a control plane for managing communication of the data packets in the communications network, wherein the user plane executes one or more packet processing pipeline threads configured to process incoming packets and the control plane executes one or more control threads, the method comprising:
receiving, by a packet processing pipeline thread running in a software data plane, a packet for processing based on a match to an associated packet processing graph in the software data plane comprising one or more tables containing rules that are applicable for a flow associated with the packet;
accessing, by the packet processing pipeline thread, the associated packet processing graph for the packet;
determining, by the packet processing pipeline thread, that the associated packet processing graph contains an action comprising a set of rules for modifying the packet processing graph while processing the packet;
accessing, by the packet processing pipeline thread, a table to modify in the packet processing graph based on a table identifier in the action;
modifying, by the packet processing pipeline thread while processing the packet, the accessed table by:
inserting one or more table rows into the associated packet processing graph, the table rows containing actions to be performed on the packet, wherein the inserted table rows are prefabricated and comprise pre-allocated resources;
for each inserted table row, inserting a set of template actions containing prepopulated fields that define actions to be performed on the packet; and
using, by the packet processing pipeline thread, the modified table to process subsequent packets;
wherein:
the action comprises:
a rule for identifying a set of resource pools from which to allocate objects, identifiers, and predetermined information to be associated with the flow, and
a rule for extracting a key from the packet that triggers the actions to be performed on the packet for each new table row that is inserted; and
the template actions contain fields that use the allocated resources.

2. The method of claim 1, wherein the action comprises a rule for extracting a key from the packet that triggers the action.

3. The method of claim 1, wherein the action comprises a rule for identifying a set of resource pools from which to allocate resources for the modified packet processing graph.

4. The method of claim 3, wherein the template actions contain fields that use the allocated resources.

5. The method of claim 3, further comprising instantiating a set of queues between the control threads and each CPU core that is running a packet processing pipeline thread.

6. The method of claim 5, wherein the instantiated queues comprise a first queue for prepopulated table rows comprising a set of actions for each entry, and a second queue for each resource pool.

7. The method of claim 3, wherein the control threads prepopulate the table rows and pre-allocate resources from each of the resource pools.

8. The method of claim 5, wherein the packet processing pipeline threads read prepopulated table rows and resources from the queues, inserts data in the prepopulated table rows from the packet and the resources, and insert rows into tables.

9. The method of claim 1, further comprising instantiating a set of queues between a processing core running the packet processing pipeline threads and a control core running the control threads, the set of queues configured to notify the control threads of added table rows and resources that are associated with the added rows.

10. The method of claim 9, further comprising adding a notification to the set of queues describing the added rows and associated resources, wherein the control threads replenish any gaps in corresponding queues of prepopulated rows and pre-allocated resources.

11. The method of claim 1, further comprising maintaining, by the control threads, a state for tracking the inserted rows.

12. The method of claim 7, wherein the control threads delete rows that are no longer being used and release associated resources to the resource pools.

13. A system comprising:
one or more data processing units;
a computer-readable medium having encoded thereon computer-executable instructions to cause the one or more data processing units to execute a packet processing pipeline thread of a user plane of a communications network, the packet processing pipeline thread configured to perform operations comprising:
receiving a packet being communicated between two endpoints of the communications network;
determining an associated packet processing graph for the packet;
determining that the associated packet processing graph contains an action comprising a set of rules for modifying the packet processing graph;
accessing a table to modify in the packet processing graph based on a table identifier in the action;
modifying the accessed table by:
inserting one or more table rows into the packet processing graph, wherein the inserted table rows are prefabricated and comprise pre-allocated resources;
for each inserted table row, inserting a set of template actions containing prepopulated fields; and
using the modified table to process subsequent packets;
wherein:
the action comprises:
a rule for identifying a set of resource pools from which to allocate objects, identifiers, and predetermined information to be associated with for a flow associated with the packet, and
a rule for extracting a key from the packet that triggers the actions to be performed on the packet for each new table row that is inserted; and
the template actions contain fields that use the allocated resources.

14. The system of claim 13, wherein the action comprises a rule for extracting a key from the packet that triggers the action.

15. The system of claim 13, wherein the action comprises a rule for identifying a set of resource pools from which to allocate resources for the modified packet processing graph.

16. A computer-readable storage medium having encoded thereon computer-executable instructions that, when executed, cause one or more processing units of a computing device to execute operations comprising:
receiving, by a packet processing pipeline thread running in a software data plane for communicating data packets between endpoints of a communications network, a packet to process;
determining, by the packet processing pipeline thread, an associated packet processing graph for the packet;
determining, by the packet processing pipeline thread, that the associated packet processing graph contains an action comprising a set of rules for modifying the packet processing graph;
accessing, by the packet processing pipeline thread, a table to modify in the packet processing graph based on a table identifier in the action;
modifying, by the packet processing pipeline thread, the accessed table by:
inserting one or more table rows into the packet processing graph, wherein the inserted table rows are prefabricated and comprise pre-allocated resources;
for each inserted table row, inserting a set of template actions containing prepopulated fields; and
using, by the packet processing pipeline thread, the modified table to process subsequent packets;
wherein:
the action comprises:
a rule for identifying a set of resource pools from which to allocate objects, identifiers, and predetermined information to be associated with for a flow associated with the packet, and
a rule for extracting a key from the packet that triggers the actions to be performed on the packet for each new table row that is inserted; and
the template actions contain fields that use the allocated resources.

17. The computer-readable storage medium of claim 16, wherein the action comprises a rule for identifying a set of resource pools from which to allocate resources for the modified packet processing graph, further comprising computer-executable instructions that, when executed, cause one or more processing units of a computing device to execute operations comprising instantiating a set of queues between one or more control threads and each CPU core that is running a packet processing pipeline thread.

18. The computer-readable storage medium of claim 17, wherein the instantiated queues comprise a first queue for prepopulated table rows comprising a set of actions for each entry, and a second queue for each resource pool.

19. The computer-readable storage medium of claim 17, wherein the control threads prepopulate the table rows and pre-allocate resources from each of the resource pools.

20. The computer-readable storage medium of claim 19, wherein the packet processing pipeline threads read prepopulated table rows and resources from the queues, inserts data in the prepopulated table rows from the packet and the resources, and insert rows into tables.

* * * * *